United States Patent [19]

Cipolli et al.

[11] Patent Number: 5,302,642

[45] Date of Patent: Apr. 12, 1994

[54] SELF-EXTINGUISHING POLYMERIC COMPOSITIONS

[75] Inventors: Roberto Cipolli, Novara; Roberto Oriani, Milan; Enrico Masarati, Castelnuovo Valtidone; Gilberto Nucida, San Giuliano Milanese, all of Italy

[73] Assignee: Ministero Dell'Universita' e Della Ricerca Scientifica e Technologica, Rome, Italy

[21] Appl. No.: 975,888

[22] Filed: Nov. 13, 1992

[30] Foreign Application Priority Data

Nov. 14, 1991 [IT] Italy .................. MI91A003038

[51] Int. Cl.⁵ .............. C08K 5/3432; C08K 5/3492; C08K 3/28
[52] U.S. Cl. ............................ 524/100; 524/96; 524/416
[58] Field of Search .............. 524/100, 416, 96

[56] References Cited

U.S. PATENT DOCUMENTS

| | | | |
|---|---|---|---|
| 4,504,610 | 3/1985 | Fontanelli et al. | 524/100 |
| 5,096,961 | 3/1992 | Eberspach | 524/100 |
| 5,153,245 | 10/1992 | Cipolli et al. | 524/100 |

FOREIGN PATENT DOCUMENTS

| | | |
|---|---|---|
| 0014463 | 8/1980 | European Pat. Off. |
| 0241605 | 10/1987 | European Pat. Off. |
| 0326082 | 8/1989 | European Pat. Off. |
| 0406810 | 1/1991 | European Pat. Off. |
| 1286661 | 8/1972 | United Kingdom |

Primary Examiner—Kriellion S. Morgan
Attorney, Agent, or Firm—Oblon, Spivak, McClelland, Maier & Neustadt

[57] ABSTRACT

Self-extinguishing polymeric compositions comprising an ammonium polyphosphate having the general formula:

$$(NH_4)_{n+2}P_nO_{3n+1}$$

microencapsulated with condensation compounds obtained by polymerizing polyaminic compositions essentially constituted by derivatives of 2,4,6-triamino-1,3,5-triazine, having the general formula (II):

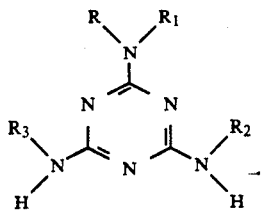

with aldehydes, preferably formaldehyde.

12 Claims, No Drawings

SELF-EXTINGUISHING POLYMERIC COMPOSITIONS

The present invention relates to self-extinguishing compositions based on thermoplastic polymers, or on polymers endowed with elastomeric properties, in particular olefinic polymers or copolymers, containing composites constituted by ammonium polyphosphate microencapsulated with aminoplastic resins.

In the art several solutions are known in order to reduce or eliminate the combustibility of polymers. Some of such solutions are based on the use of metal compounds, in particular compounds of antimony, bismuth or arsenic, jointly with partially halogenated, thermally unstable organic compounds, such as chlorinated paraffinic waxes.

Other solutions are based on the use of substances capable of causing intumescence. The formulations of intumescent type are generally constituted by the polymer and at Least three main additives: one essentially phosphorus containing additive, the purpose of which is of forming, during the combustion, a semi-solid, impermeable glassy Layer essentially constituted by polyphosphoric acid, and of initiating the process of intumescence formation; a second, nitrogen containing, additive, which performs the task of foaming agent; and a third, carbon containing, additive, which acts as a carbon donor, in order to form an insulating, cellular carbonaceous Layer (char) between the polymer and the flame.

Examples of this type of intumescent formulations are those as reported in the following patents: U.S. Pat. No. 3,810,862 (Phillips Petroleum Co.), based on melamine, pentaerythritol and ammonium polyphosphate; U.S. Pat. No. 4,727,102 (Vamp S.r.L), based on melamine cyanurate, a hydroxyalkyl derivative of isocyanuric acid and ammonium polyphosphate; and published patent application WO 85/05626 (Plascoat U.K. Limited), based on various phosphorus and nitrogen compounds among which, in particular, a combination of melamine phosphate, pentaerythritol and ammonium polyphosphate may be cited.

In more recent formulations, together with the use of an organic or inorganic phosphorus compound, a nitrogen containing organic compound was used, which generally is an aminoplastic resin obtained by means of the condensation of urea, melamine or dicyandiamide with formaldehyde.

Examples of double-additive formulations are those as reported in U.S. Pat. No. 4,504,610 (Montedison S.p.A.), based on oligomeric derivatives of 1,3,5-triazine and ammonium polyphosphate; and European patent 14,463 (Montedison S.p.A.), based on organic compounds selected from benzylguanamine and reaction products of aldehydes with various nitrogen-containing cyclic compounds, in particular benzylguanamine-formaldehyde copolymers, and ammonium polyphosphate.

Self-extinguishing compositions can also be obtained by using single-component additives, containing both nitrogen and phosphorus in their organic molecule, as disclosed in U.S. Pat. No. 4,201,705 (Borg-Warner Corp.).

These intumescent flame-retardant systems endow the polymer which contains them with the property of giving rise to the formation of a carbonaceous residue following a fire or the application of a flame. This type of flame-retardant systems display a number of advantages: absence of phenomena of corrosion in the machinery on which polymers are processed; tower smoke emission than as of those systems which contain metal compounds and halogenated hydrocarbons; and, above all, the possibility of endowing the polymers with satisfactory flame-retardant properties with a smaller amount of total additive, and, therefore, without an excessive decay in mechanical properties of the same polymers.

As disclosed hereinabove, the intumescent formulations constituted by three or two components prevailingly use, as said hereinabove, ammonium polyphosphate as their phosphorus-containing additive.

The nearly exclusive use of ammonium polyphosphate in the intumescent type of formulations, as compared to ammonium or amine phosphates and/or phosphonates is, as compared to them, essentially due to its higher thermal stability and lower water solubility.

In spite of that, ammonium polyphosphate suffers still from some Limitations as regards its solubility in water, in particular in hot water.

In fact, those ammonium polyphosphates are preferred which are encompassed by the general formula

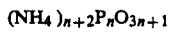

$(NH_4)_{n+2}P_nO_{3n+1}$ in which n represents an integer numeral equal to, or higher than, 2; preferably, the molecular weight of polyphosphates should be high enough in order to secure a low water solubility. For indicative purposes, "n" is preferably comprised within the range of from 2 to 500.

The composition of polyphosphates having the above indicated formula, in which n is a Large enough number and is preferably comprised within the range of from 50 to 500, practically is that composition which corresponds to the formula of metaphosphates

$(NH_4PO_3)_n$.

An example of such polyphosphates is the product known under the trade name "Exolit 422" (produced and traded by Hoechst) and having the composition $(NH_4PO_3)_n$ in which n is higher than 50; another example is the product known under the trade name "PhosCheck P/40" (Monsanto Chemical), and having a similar composition.

The contrivance which drastically reduced the solubility of ammonium polyphosphate in water is the process of microencapsulation thereof inside resins, of various chemical natures, insoluble in water.

Furthermore, such a treatment additionally endows ammonium polyphosphate with higher free-flowing characteristics, above all as regards its use as flame-retardant additive in polyurethanic foams.

Examples of microencapsulated ammonium polyphosphate are those as reported by U.S. Pat. No. 4,347,334, with phenol-formaldehyde resin; U.S. Pat. No. 4,467,056 and European patent No. 180,795, with melamine-formaldehyde resin; European patent No. 180,790, with polyureas; U.S. Pat. No. 4,514,328, with epoxy resins; and European patent No. 178,564, with poly isocyanurates.

An example of such microencapsulated polyphosphates is the product known under the trade name "Exolit 462" (manufactured and traded, Like the following products, by Hoechst A. G.), and corresponding to ammonium polyphosphate (APP) microencapsulated in melamine-formaldehyde resin; another example is the product known under the trade name "Exolit 455" and corresponding to APP microencapsulated in epoxy resin; still a further product is "Exolit 470", which corresponds to APP microencapsulated in poly carbodiimidic resin.

The use of the above said microencapsulated products in intumescent polymeric formulations is reported, e.g., by the following patents: European patent No. 193,793 (Hoechst A.G.), in which Exolit 462 and Exolit 455 products are blended with ethyleneurea-formaldehyde polycondensate; European patent No. 258,685 (Hoechst A.G.), in which Exolit 462 and Exotit 470 products are blended with tris (2-hydroxyethyl) isocyanurate (THEIC), and published patent application WO 89/01011 (VAMP S.r.L.), in which Exolit 455 product is blended with a polymer of tris (2-hydroxyethyl) isocyanurate (poly THEIC).

As one can observe from the about cited examples, the various microencapsulated ammonium polyphosphate products do not render intumescent the polymeric compositions which contain them, but, in order to perform their action, they require that an organic component is present, which acts as a carbon donor for char formation.

In other terms, the process of ammonium polyphosphate microencapsulation only improves, as already said, its high temperature insolubility, but does not modify the characteristics thereof as a flame-retardant additive for intumescent formulations.

The present Applicant has found now that, contrarily to the teachings of the prior art, excellent self-extinguishing characteristics can be supplied to polymer by means of the use of ammonium polyphosphate microencapsulated with a novel class of polycondensed nitrogenous compounds, without using any further coadditives.

Such a result is surprising, because it is obtained with ammonium polyphosphate microencapsulated with simple structure aminoplastic resins, prepared by means of the polymerization with aldehydes, preferably formaldehyde, of polyaminic composition, essentially constituted by derivatives of 2,4,6-triamino-1,3,5-triazine.

As already said hereinabove, reaction products of aldehydes and various nitrogenous cyclic compounds are known in the art (European patent EP 14,463), which can be used, together with ammonium polyphosphate, for self-extinguishing composition in various polymeric matrixes, in particular polyolefins.

Although they display a good activity as flame-retardant agents, such compounds, such as, e.g., ethyleneurea-formaldehyde copolymer, endow the polymeric compositions which contain them with a limited heat stability both during the processing and compounding steps (extrusion and moulding processes) and to thermooxidation, and furthermore require, in order to perform their action., a considerably large content of phosphorous containing co-additive.

Other compounds, such as, e.g., melamine-formaldehyde copolymer, used in many examples as the resins for ammonium polyphosphate microencapsulation, results to be unsuitable to confer self-extinguishing properties to the above said polymer, even when they are used in Larger amount than as used for the microencapsulation as such.

Also the use of mixed compounds, such as, e.g., ethyleneurea-melamine-formaldehyde torpolyner, is not enough in order to cause the polymeric compositions to reach satisfactory values of heat stability, although it contributes to improve it.

On the contrary, the use of microencapsulated ammonium polyphosphate according to the present invention, makes it possible self-extinguishing polymeric compositions to be obtained which are endowed with:

(1) excellent self-extinguishing characteristics with a total content of flame-retardant additive which is lower than as necessary when the mixtures of ammonium polyphosphate and aminoplastic resins known from the prior art are used, hence making it possible savings in formulation costs to be obtained together with a further decrease in decay of mechanical properties of the same polymers;

(2) good thermal stability both during the polymer processing step and to thermooxidation, thus making it possible the compounding process to be carried out at higher temperatures than as allowed by the above said mixtures known from the prior art.

The microencapsulated ammonium polyphosphate according to the present invention retains furthermore the low values of water solubility, both at high and at low temperature, which are typical of the analogous products known from the prior art and, above all, displays, as compared to them, a good stability to heating, thusly retaining a high flame retardant activity also after the processes of high temperature processing of the polymeric compositions which contain them.

Finally, the polymeric compositions according to the present invention display the advantage that they, in the case of a fire, give rise to a very moderate and non obscuring smoke emission.

Therefore, the subject matter of the present invention are the self-extinguishing compositions comprising:

(a) from 90 to 40 parts by weight of a thermoplastic polymer, or of a polymer endowed with elastomeric properties;

(b) from 10 to 60, preferably from 15 to 40, parts by weight of one or more composites constituted by ammonium polyphosphate of general formula (I):

$$(NH_4)_{n+2}P_nO_{3n+1} \quad (I)$$

wherein n stands for an integer numeral comprised within the range of from 2 to 800, preferably of from 5 to 500, microencapsulated with 10–80%, preferably 15–60%, by weight of a resin obtained by polymerizing with aldehydes a mixture comprising:

(1) from 0 to 50 parts by weight of one or more polyaminic derivatives;

(2) from 50 to 100 parts by weight of one or more derivatives of 2,4,6-triamino-1,3,5-triazine having the general formula (II):

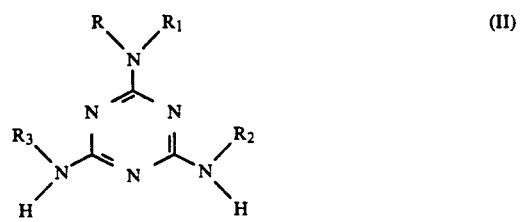

wherein at Least one of radicals from R to $R_3$ is:

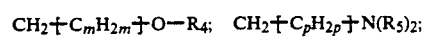

$$CH_2 \!+\! C_mH_{2m} \!+\! O \!-\! R_4; \quad CH_2 \!+\! C_pH_{2p} \!+\! N(R_5)_2;$$

-CH$_2$-[-C$_m$H$_{2m}$-]-O-R$_4$-CH$_2$-[-C$_p$H$_{2p}$-]-N(R$_5$)$_2$
wherein:
m=an integer comprised within the range of from 1 to 7, and preferably from 1 to 3
p=an integer comprised within the range of from 1 to 5
R$_4$=C$_1$-C$_8$ alkyl; preferably H; C$_1$-C$_4$ alkyl; C$_2$-C$_6$ alkenyl; -[-C$_q$H$_{2q}$-]-O-R$_6$ wherein q is an integer comprised within the range of from 1 to 4 and R$_6$ is H or C$_1$-C$_4$ alkyl; C$_6$-C$_{12}$ cycloalkyl or alkylcycloalkyl;
the radicals R$_5$, which may be the same, or different from each other, are:
H, C$_1$-C$_8$ alkyl; C$_2$-C$_6$ alkenyl; C$_6$-C$_{12}$ cycloalkyl or alkylcycloalkyl; C$_1$-C$_4$ hydroxyalkyl; or the moiety:

is replaced by a heterocyclic radical Linked to the alkyl chain through the nitrogen atom, and possibly containing another heteroaton preferably selected from O, S, N;
or in the general formula (II), the moiety:

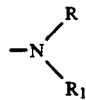

is replaced by a heterocyclic radical Linked to the triazinic ring through the nitrogen atom, and possibly containing another heteroatom
preferably selected from O, S, N;
the other radicals from R to R$_3$, which may be the same or different from one another, have the above said meaning, or they are:
H; C$_1$-C$_{18}$ is alkyl; C$_2$-C$_8$ alkenyl; C$_6$-C$_{16}$ cycloalkyl or alkylcycloalkyl, possibly substituted with a hydroxy or C$_1$-C$_4$ hydroxyalkyl function.

According to a preferred form of practical embodiment of the composite according to the present invention, the polyaninic derivative is selected from compounds containing the 1,3,5-triazine ring, or at least one

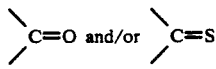

moiety.

The components (1) and (2) shall be selected in such a way as to secure a high level of crosslinking with the aldehydes, in order to maximize the microencapsulation of ammonium polyphosphate and consequently reduce its water solubility down to very low values.

Preferably, the aldehyde is formaldehyde or a mixture containing formaldehyde and, up to 20% by mol, another aldehyde with general formula (III):

    (III)

wherein R$_7$ is C$_1$-C$_8$ alkyl; C$_2$-C$_6$ alkenyl; C$_6$-C$_{12}$ cycloalkyl; C$_6$-C$_{12}$ aryl.
However, formaldehyde is the preferred aldehyde.

Examples of ammonium polyphosphate of general formula (I) are:
ammonium pyrophosphate, ammonium tripolyphosphate, commercial ammonium polyphosphate, such as, for example, those respectively known under the marks "Exolit 422" (manufactured and marketed by Hoechst) and "Phos-Chek P/40" (Monsanto Chemical).

Examples of radicals from R to R$_3$ in general formula (II) are: methyl; ethyl; propyl; isopropyl; n-butyl; isobutyl; tert -butyl; n-pentyl; isopentyl; n-hexyl; tert -hoxyl; octyl; tert -octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohoxyl; hydroxyethylcyclohexyl 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyhexyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino) ethyl; 3-(N,N-dimethylamino) propyl; 4-(N,N-diethylamino) butyl; 5-(N,N-diethylamino) pentyl; 5-(N,N-diisopropylamino)-pentyl; 3-(N-ethylamino) propyl; 4-(N-methylamino)-butyl; 5-(N,N-diethylamino) pentyl; 3-(N-ethylamino)-propyl; 4-(N-methylamino) butyl; 4-(N,N-dipropylamino)-butyl; 2-(N,N-diisopropylamino) ethyl; 6-(N-hexenylamino) hexyl; 2-(N-ethenylamino) ethyl; 2-(N-cycloxhexylamino) ethyl; 2-(N-2-hydroxyethylamino)-ethyl; 2-(2-hydroxyethoxy) ethyl; 2-(2-methoxyethoxy)-ethyl; 6-(N-propylamino) hexyl; and so forth.

Examples of heterocyclic radicals which may replace the moiety:

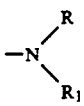

in general formula (II) are: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazing; 2,2,5,5-tetramethylpiperazing; 2-ethylpiperazine; 2,5-diethylpiperazine; and so forth.

Examples of heterocyclic radicals which may replace the moiety:

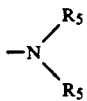

are:
aziridine; pyrrolidine; piperidine; morpholine; thiomorpholine; piperazine; 4-methylpiperazine; 4-ethylpiperazine; and so forth.

Examples of polyaminic derivatives are: urea; ethyleneurea; thiourea; othylenethiourea; propyleneurea; metanine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

By "formaldehyde", as this term is used in the instant disclosure and in the appended claims, any forms are meant, in which formaldehyde is usually marketed: aqueous solution, metaformaldehyde, paraformaldehyde.

Examples of radicals $R_7$ are: methyl; othyl; n-propyl; n-butyl; n-hexyl; n-octyl; ethenyl; propenyl; cyclohexyl; phenyl; and so forth.

The compounds according to the present invention can be synthetized as follows:

(i) by reacting in solution, with a suitable solvent (such as, e.g., mothyl alcohol, ethyl alcohol, water or their mixtures, and so forth), the derivative of 2,4,6-triamino-1,3,5-triazine having the general formula (II), either mixed or not mixed with the polyaminic derivative, with aldehydes. The molar ratio of the triazinic derivative of general formula (II), or of its mixture with the polyaminic derivative, to the aldehydes, is comprised within the range of from 1:1 to 1:6.

The reaction is carried out at a pH value comprised within the range of from 7 to 12, possibly obtained by adding an alkali (such as, for example, potassium carbonate sodium carbonate, sodium hydroxide, and so forth), at temperatures comprised within the range of from 20° C. to solvent boiling point, until a solution is obtained;

(ii) causing the resulting reaction product to turn into a resin by feeding it to a dispersion of ammonium polyphosphate having the general formula (I), in finely subdivided form, with particle size smaller than 70 micrometres, in a Liquid of the above mentioned type, having a pH value comprised within the range of from 1 to 5, and heated at a temperature of from 40° C. to 150° C. pH values comprised within the range of from 1 to 5 can be obtained by possibly adding an acid (such as, e.g., sulfuric acid, hydrochloric acid, phosphoric acid, and so forth) to said dispersion. The resulting mixture is kept further stirred at the selected temperature, during the necessary time to complete the resinification and microencapsulation process, preferably of from 1 to 12 hours. The resulting product, constituted by microencapsulated ammonium polyphosphate, is filtered off.

The composite is first dried at 100° C., then is submitted to thermal treatment for some hours, preferably of from 1 to 3 hours, in a vacuum oven at 150° C.

Generally, a good quality composite is obtained as a white crystalline powder, with a distribution of particle size substantially identical to the particle size distribution of ammonium polyphosphate used.

Possibly present agglomerates of material are easily broken without causing the particle coating to be fractured.

The resulting composite can be used in self-extinguishing polymeric compositions without any further treatments.

The effectiveness of ammonium polyphosphate microencapsulation is evaluated by measuring the solubility of the obtained composite in water at 60° C., according to a process disclosed in the following.

An alternative synthesis route consists in causing the reactions of steps (i) and (ii) to take place as one single step, at a pH value comprised within the range of from 1 to 5, and at a higher temperature than 40° C.

Many of derivatives of 2,4,6-triamino-1,3,5-triazine with general formula (II) are known; they can anyway be easily synthetized according to as disclosed in European Patent application publication No. 406,810, to the same Applicant s name.

Preferably the (b) component is constituted by ammonium polyphosphate microencapsulated with aminoplastic resins obtained by means of the polymerization with formaldehyde of the only derivatives of general formula (II), in which R and/or $R_1$ are equal to hydrogen, or of their mixture with melamine.

Polymeric compositions also having self-extinguishing characteristics can be obtained by adding to microencapsulated ammonium polyphosphate according to the present invention both ammonium or amine phosphates and/or phosphonates, and organic compounds which are usually used in intumescent formulations as carbon donors for char formation.

Among those polymers which can be used in the composition of the present invention, preferred are polymers or copolymers of olefins having the general formula

$$R-CH=CH_2$$

wherein R is a hydrogen atom or a $C_1$-$C_8$ alkyl or aryl radical, in particular:

1. isotactic or prevailingly isotactic polypropylene;
2. HDPE, LLDPE, LDPE polyethylene;
3. crystalline propylene copolymers with minor proportions of ethylene and/or other alpha-olefins, such as, e.g., 1-butene, 1-hexene, 1-octene, 4-methyl-1-pentene;
4. heterophasic compositions comprising: (A) a homopolymeric propylene fraction, or one of copolymers as Listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene;
5. elastomeric ethylene copolymers with alpha-olefins, possibly containing minor proportions of a diene.

Examples of dienes which are more commonly contained in the above said elastomeric copolymers are butadiene, ethylidene-norbornene, hexadiene 1-4.

Among polymers of olefins having formula

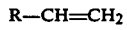

$$R-CH=CH_2$$

in which R is an aryl radical, "crystal" polystyrene and high-impact polystyrene are preferred.

Other examples of polymers which may commonly be used are acrylonitrile/butadiene/styrene (ABS) and styrene/acrylonitrile (SAN) copolymers; (polyester and polyether) polyurethane; poly (ethylene terephthalate); poly (butylene terephthalate); polyamides; and so forth.

The self-extinguishing compositions according to the present invention can be prepared according to well-known methods: for example, the composite constituted by microencapsulated ammonium polyphosphate, is added, as a finely subdivided powder (preferably with smaller particle size than 70 micrometres), to the polymer in a turbomixer, in order to form a homogeneous compound which is extruded and pelletized. The resulting granular product can be transformed into various articles of manufacture according to any of the well-known molding techniques.

The flame-retardant additives according to the present invention are suitable for use also in the field of flame-retardant paints.

Condensation compounds constituted by ammonium polyphosphate of general formula (I) microencapsulated with 10-80% by weight of a resin obtained by polymerizing with formaldehyde only, the melaminic derivatives of general formula (I), either containing or not containing polyaminic derivatives, not cited in the examples, but which can be advantageously used as well in the self-extinguishing polymeric compositions according to the present invention, are those as reported in following Table 1.

TABLE 1

| COMPOUND N° | Derivative of general formula (I) | | | | Polyaminic derivative | | Molar ratio amines/formaldehyde | Ratio by weight APP/resin |
| --- | --- | --- | --- | --- | --- | --- | --- | --- |
| | R—N—R$_1$ | R$_2$ | R$_3$ | Parts by weight | Designation | Parts by weight | | |
| 1 | (CH$_2$)$_3$OH | H | H | H | 85 | Acetoquanamine | 15 | 1:8.0 | 3.2:1 |
| 2 | (CH$_2$)$_2$OCH$_3$ | (CH$_2$)$_2$OCH$_3$ | H | H | 58 | Melamine | 42 | 1:5.0 | 1.6:1 |
| 3 | (CH$_2$)$_3$OCH$_3$ | H | H | H | 100 | — | | 1:6.0 | 3.2:1 |
| 4 | (piperidinyl) | | H | H | 66 | Melamine | 34 | 1:5.0 | 3.0:1 |
| 5 | CH$_2$CH$_2$OH | H | H | H | 90 | Benzoquanamine | 10 | 1:3.5 | 3.5:1 |
| 6 | (CH$_2$)$_5$OH | H | H | H | 100 | — | | 1:6.0 | 2.8:1 |
| 7 | (thiomorpholinyl) | | H | H | 60 | Melamine | 40 | 1:5.0 | 1.4:1 |
| 8 | CH$_2$CH$_2$OCH$_3$ | H | H | H | 87 | Benzylquanamine | 13 | 1:4.5 | 2.8:1 |
| 9 | (CH$_2$)$_2$O(CH$_2$)$_2$OH | H | H | H | 100 | — | | 1:3.5 | 2.6:1 |
| 10 | (azetidinyl) | | H | H | 55 | Melamine | 45 | 1:4.5 | 2.9:1 |
| 11 | CH$_2$CH$_2$OH | CH$_3$ | H | H | 63 | Melamine | 37 | 1:3.6 | 2.3:1 |
| 12 | (CH$_2$)$_3$N(C$_2$H$_5$)$_2$ | H | H | H | 100 | — | | 1:5.0 | 3.1:1 |
| 13 | (piperazinyl N—H) | | H | H | 75 | Melamine | 25 | 1:3.2 | 1.7:1 |
| 14 | CH$_2$CH$_2$OH | H | CH$_2$CH$_2$OH | H | 88 | Succinoquanamine | 12 | 1:4.0 | 2.6:1 |
| 15 | CH$_2$CH$_2$OCH$_3$ | H | CH$_2$CH$_2$OCH$_3$ | CH$_2$CH$_2$OCH$_3$ | 100 | — | | 1:2.5 | 1.5:1 |
| 16 | (morpholinyl) | | CH$_2$CH=CH$_2$ | H | 100 | Melamine | 35 | 1:3.2 | 4.0:1 |
| 17 | (CH$_2$)$_3$OC$_2$H$_5$ | H | H | H | 86 | Propyleneurea | 14 | 1:2.8 | 4.0:1 |
| 18 | (morpholinyl) | | t-C$_4$H$_9$ | H | 70 | Melamine | 30 | 1:3.0 | 2.8:1 |
| 19 | CH$_2$CH$_2$OCH$_3$ | H | C$_2$H$_5$ | C$_2$H$_5$ | 100 | — | | 1:2.4 | 3.2:1 |
| 20 | (morpholinyl) | | CH$_2$CH$_2$OCH$_3$ | H | 66 | Melamine | 34 | 1:2.8 | 2.9:1 |
| 21 | CH$_2$CH$_2$OH | H | CH$_2$CH$_2$OH | CH$_2$CH$_2$OH | 80 | Melamine | 20 | 1:2.5 | 3.0:1 |

TABLE 1-continued

| COMPOUND N° | Derivative of general formula (I) | | | | Polyaminic derivative | | Molar ratio amines formaldehyde | Ratio by weight APP resin |
|---|---|---|---|---|---|---|---|---|
| | R—N—R$_1$ | R$_2$ | R$_3$ | Parts by weight | Designation | Parts by weight | | |
| 22 | CH$_2$CH$_2$OH | ⬡ | H | H | 62 | Melamine | 38 | 1:3.0 | 2.6:1 |

APP = Exolit ® ammonium polyphosphate (Hoechst)

The examples disclosed in the following illustrate the features of the invention without limiting them.

As mentioned hereinabove, the effectiveness of the process for ammonium polyphosphate microencapsulation is evaluated by measuring the solubility in water at 60° C. of the resulting product, according to the following process.

A number of grasses of composite according to the present invention are weighed, which are equal to:

$$\frac{10}{APP \%} \times 100$$

wherein:

APP % is the value of the percent content, by weight, of ammonium polyphosphate contained in the composite obtained in the examples disclosed in the following (and determined by means of elemental analysis for phosphorus content), and are charged, together with 100 cm$^3$ of distilled water, to a reactor of 0.25 liters equipped with stirrer, thermometer, reflux condenser and heating bath. The dispersion is heated up to 60° C., and is kept at that temperature value for 20 minutes, then the dispersion is centrifuged for 45 minutes.

Subsequently, 5 cm$^3$ of clear Liquid phase is drawn and is dried in oven at 120° C.

The solubility of ammonium polyphosphate, expressed as g/100 g of water, is calculated from the weight of the residue (APP).

A further confirmation of the encapsulation degree achieved is obtained by analyzing the obtained products by scanning electron microscopy, with a CAMBRIDGE STEREOSCAN 200 model SEN, which makes it possible, besides crystal size, the type and amount to be evaluated of resin coating deposited on ammonium polyphosphate crystals.

EXAMPLE 1

184.5 g of cyanuric chloride and 800 CM$^3$ Of acetone are charged to a reactor of 3 Liters of capacity, equipped with stirrer, thermometer, dripping funnel, reflux condenser and heating bath.

With stirring, the reaction mixture is heated up to 40° C. in order to obtain a solution, then 284 g of an aqueous solution of ammonia at 30% by weight is added during a 1 hour and 30 minutes time. The reaction mixture is subsequently heated up to 45° C. and is kept 4 hours at this temperature.

After cooling, the resulting product is filtered off and is washed on the filter with water.

After oven drying at 50°-60° C. under vacuum, 113 g of intermediate (IV):

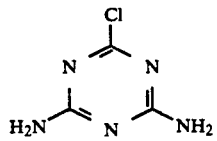

(IV)

are obtained as an infusible, crystalline powder of white colour, containing 24.12% of chlorine (theoretical chlorine content=24.36%).

101.9 g of intermediate (IV), 500 cm$^3$ of water and then, with stirring, 44.8 g of 2-hydroxyethylamine are charged to a reaction vessel of 1 liter of capacity equipped with stirrer, thermometer, addition funnel, reflux condenser and heating bath.

The reaction mixture is heated up to boiling temperature and then is caused to reflux for 4 hours.

The reaction mixture is then caused to reflux for a further 8 hours, with 28 g of sodium hydroxide in 100 cm$^3$ of water being added portion wise, so as to keep pH value always comprised within the range of from 7 to 8.

The reaction mixture is cooled down to 15° C., the resulting product is filtered off, and the filter cake is washed on the same filter with cold water.

By drying the filter cake in an oven at 100° C., 107.5 g of 2-(2-hydroxyethyl) amino-4,6-diamino-1,3,5-triazine (V):

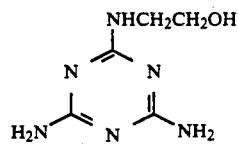

(V)

are obtained as a white crystalline powder with m.p.=225° C.-230° C. (m.p.=melting point).

The structure of intermediates (IV) and V was furthermore confirmed by IR spectroscopic analysis.

45 cm$^3$ of methanol, 51.1 g of an aqueous solution at 37% by weight of formaldehyde and, with stirring, 30.6 g of intermediate (V) are charged to a reactor of 0.25 liters of capacity, equipped as the preceding one.

The reaction mass is heated at 70° C. for 30 minutes, until a solution is obtained.

The resulting solution, kept at 70° C., is fed, during a 30 minute time, to the same 1 liter reactor as disclosed hereinabove, containing a suspension consisting of 90 g of ammonium polyphosphate (Exolit ® 422, with a phosphorus content of 31.4%), 200 cm$^3$ of methanol and 200 cm$^3$ of water, heated at 65° C.

The resulting mixture is heated to boiling temperature and is kept refluxing for 7 hours.

The reaction mixture is allowed to cool down to room temperature, and the resulting product is filtered off, with the filter cake being washed with a water-methanol mixture.

By drying the filter cake in an oven at 100° C., and subsequently submitting it to a heat treatment at 150° C. for 2 hours under vacuum, 116 g of a crystalline product of white colour are obtained, which contains 23.4% of phosphorus, corresponding to a content of 74.5% by weight of ammonium polyphosphate.

The obtained product corresponds hence to ammonium polyphosphate microencapsulated with resin in a ratio of 2.92:1 by weight.

The solubility of thus encapsulated ammonium polyphosphate in water at 60° C. is of 6.3% by weight.

The solubility of Exolit ® 422 in water at 60° C. is higher than 65% by weight.

EXAMPLE 2

600 cm³ of water and 92.2 g of cyanuric chloride are charged to a reactor of 2 liters of capacity equipped as in Example 1, but initially provided with a cooling bath.

While keeping the reaction mixture cooled at 2° C. by external cooling, 75.0 g of 2-methoxyethylamine in 100 cm³ of water is fed during a 2 hour time; during the addition, the temperature is allowed to gradually increase up to 5°-7° C.

The temperature is increased up to 20° C. and is kept at that value for 1 hour, then the reaction mixture is heated to 35-40° C. and 40 g of sodium hydroxide dissolved in 100 cm³ of water is added during approximately 3 hours.

The reaction mass is heated up to 60°C and is kept at that temperature during 2 hours.

The reaction mixture is cooled down to room temperature and the resulting product is filtered off, with the filter cake being washed on the same filter, with water.

By oven-drying the fieter cake at 100° C., 120.4 g of intermediate (VI):

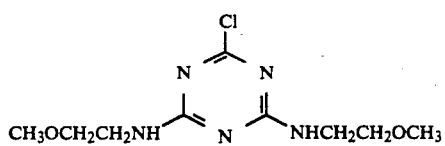

are obtained as a white crystalline powder having m.p.=162° C.-164° C., and a chlorine content of 13.48% (theoretical value: 13.57%).

600 cm³ of water, 78.5 g of intermediate (VI) and 22.5 g of 2-methoxyethylamine are charged to the same reactor of 2 liters of capacity.

The reaction mass is heated up to boiling temperature and is kept refluxing for 2 hours, then, during about 3 hours, approximately 12 g of sodium hydroxide dissolved in 50 cm³ of water is added.

The reaction mixture is kept boiling for a further 2 hours, then is cooled down to room temperature.

The aqueous solution is treated with 3 portions, of 300 cm³ each, of methylene chloride.

The organic extracts are combined, are thoroughly dried and are submitted to distillation.

86.7 g of 2,4,6-tris (2-methoxyethyl) amino-1,3,5-triazine (VII):

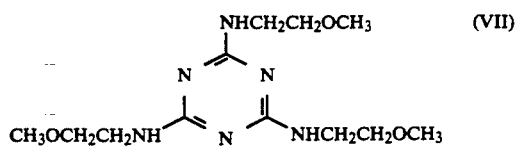

are obtained as a very thick Liquid product (m.p.=13° C.).

The structure of intermediates (VI) and (VII) was also confirmed by NMR analysis.

60 cm³ of water, 60 cm³ of methanol, 9.0 g of paraformaldehyde and, with stirring, 30.0 g of intermediate (VII) are charged to a reactor of 0.25 liters, equipped as the preceding one.

The reaction mass is heated at 60° C. for 10 minutes, until a solution is obtained.

The resulting solution, kept at 60° C., is fed, during a 20 minute time, to a suitably equipped steel reactor of 1 liter of capacity, containing a suspension constituted by 110 g of ammonium polyphosphate (Exolit ® 422), 250 cm³ of rater and 250 cm³ of methanol, heated at 65° C.

The reaction mixture is heated to 120° C., and is kept at that temperature for approximately 10 hours.

The reaction mixture is allowed to cool down to room temperature, and the resulting product is filtered, with the filter cake being washed on the filter with a water-methanol mixture.

Then, by proceeding according to the same operating modalities as disclosed in Example 1, 141.1 g of a crystalline product of white colour containing 24.0% of phosphorus, corresponding to a content of 76.4% of ammonium polyphosphate by weight, are obtained.

The resulting product corresponds to ammonium polyphosphate microencapsulated with resin in the ratio of 3.24:1 by weight.

The solubility of ammonium polyphosphate in water at 60° C. is of 5.6% by weight.

EXAMPLE 3

91 g of intermediate (IV), 240 cm³ of toluene and 110 g of morpholine are charged to the same reaction equipment of 1 liter of capacity as disclosed in Example 1.

The reaction mixture is heated to 65°-70° C. and is kept at that temperature for 2 hours; the reaction mixture is then heated up to boiling temperature and is kept refluxing for 1 hour.

The reaction mixture is allowed to cool down to room temperature, and then the resulting product is isolated by filtration. The filter cake is washed with plentiful water, and, after drying, 92 g of 2,4-diamino-6-morpholino-1,3,5-triazine (VIII):

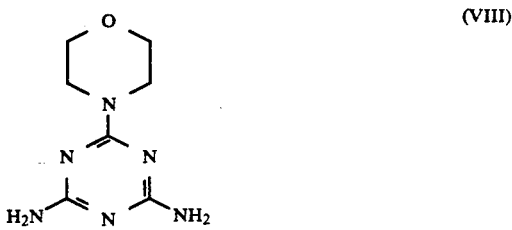

are obtained as a white crystalline powder with m.p.=248° C.-250° C.

The structure of intermediate (VIII) was confirmed by NMR analysis.

50 cm³ of methanol 82 g of a solution at 37% by weight of formaldehyde and, with stirring, 19.6 9 of intermediate (VIII) and 12.6 g of 2,4,6-triamino-1,3,5-triazine (melamine) are charged to the same reaction vessel of 0.25 liter of capacity of Example 1. The reaction mass is kept heated at 70° C. for 45 minutes, until a solution is obtained.

Such a solution, kept at 70° C., is fed, during a 30 minute time, to the same reaction vessel of 1 liter of capacity as previously used, containing a suspension constituted by 90 g of ammonium polyphosphate (Exolit ® 422), 220 cm³ of water and 220 cm³ of methanol, heated at 70° C.

The reaction mixture is heated up to boiling temperature and is kept under refluxing conditions for 8 hours.

Then, by proceeding according to the same operating modalities as disclosed in Example 1, 124.4 g of a white crystalline product containing 21.8% of phosphorus, corresponding to a content of 69.4% of ammonium polyphosphate by weight are obtained.

The obtained product corresponds to ammonium polyphosphate microencapsulated with resin in the weight ratio of 2.27:1.

The solubility of ammonium polyphosphate in water at 60° C. is of 3.5% by weight.

EXAMPLE 4

49.0 g of intermediate (IV), 150 cm³ of water and 26.2 g of 2-methoxyethylamine are charged to a reactor of 0.5 liter of capacity, equipped as in Example 1.

The reaction mass is heated up to boiling temperature and is kept under refluxing conditions for 4 hours.

Subsequently, a solution constituted by 14 g of sodium hydroxide in 50 cm³ of water is added during a 20 minute time.

After a further stirring for 30 minutes, the separation of water by distillation is started; the residual mass is subsequently treated with 3 portions, of 100 cm³ each, of acetonitrile, in order to extract the organic product.

By subsequently distilling off the solvent, 52.5 g of 2,4-diamino-6-(2-methoxyethyl) amino-1,3,5-triazine (IX):

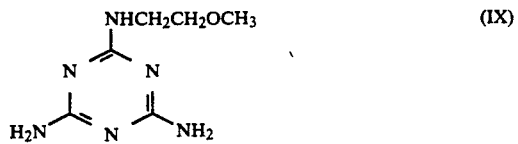

are obtained as a white crystalline powder with m.p. 166° C.–169° C.

The structure of intermediate (IX) was confirmed by NMR analysis.

150 cm³ of water, 50 cm³ of methanol, 64.9 g of a solution at 37% by weight of formaldehyde and, with stirring, 36.8 g of intermediate (IX) are charged to the same reaction equipment of 0.5 liter of capacity.

The reaction mass is heated up to 60° C. and is kept at this temperature during 30 minutes, until a solution is obtained.

The resulting solution, kept at 60° C., is fed, during a 1 hour time, to the same reaction equipment of 1 liter of capacity of the preceding examples, containing the suspension constituted by 90 g of ammonium polyphosphate (PhosCheck P/40 ®) with a phosphorus content of 31.5%) and 200 cm³ of methanol, kept boiling.

The reaction mixture is caused to reflux for 10 hours, then is cooled down to room temperature.

The resulting product is filtered off and the filter cake is washed on the same filter, with a water-methanol mixture.

After filter cake drying and heat treatment, 127.1 g are obtained of a white crystalline product with a phosphorus content of 22.1%, corresponding to a content of 70.1% of ammonium polyphosphate by weight.

The obtained product corresponds hence to ammonium polyphosphate microencapsulated with resin in the ratio of 2.34:1 by weight.

The solubility of ammonium polyphosphate in water at 60° C. is of 5.5% by weight.

The solubility of PhosCheck P/40 ® in water at 60° C. is higher than 65% by weight.

EXAMPLES 5–12

By operating under analogous conditions to as disclosed in Examples from 1 to 4, the composites reported in following Table 2 are prepared.

TABLE 2

| EX-AMPLE N° | APP (*) | Derivative of general formula (I) R—N—R₁ | R₂ | R₃ | Parts by weight | Polyaminic derivative Designation | Parts by weight | Molar ratio amines/formaldehyde | Ratio by weight APP/resin | Solubility of APP at 60° C. g/100 g of water |
|---|---|---|---|---|---|---|---|---|---|---|
| 5 | a | ⌐N  N—CH₃⌐ (piperazine) | H | H | 70 | Melamine | 30 | 1:4.0 | 2.14:1 | 6.1 |
| 6 | a | CH₂CH₂OH | H | H | 80 | Ethyleneurea | 20 | 1:2.7 | 1.82:1 | 6.8 |
| 7 | b | (CH₂)₂OCH=CH₂ | H | H | 100 | — | | 1:4.5 | 2.2:1 | 5.1 |
| 8 | a | (CH₂)₂OH | (CH₂)₂OH | H | 65 | Melamine | 35 | 1:3.5 | 2.8:1 | 3.9 |
| 9 | a | (CH₂)₃N⌐O⌐ (morpholine) | H | H | 100 | — | | 1:3.8 | 2.35:1 | 4.8 |
| 10 | b | CH₂CH₂OH | H | H | 100 | — | | 1:5.0 | 4.9:1 | 4.4 |
| 11 | a | CH₂CH₂OH | CH₂CH₂OH | H | 100 | — | | 1:4.5 | 2.6:1 | 9.1 |

TABLE 2-continued

| EX-AMPLE No | APP (*) | Derivative of general formula (I) | | | | Polyaminic derivative | | Molar ratio amines/formaldehyde | Ratio by weight APP/resin | Solubility of APP at 60° C. g/100 g of water |
|---|---|---|---|---|---|---|---|---|---|---|
| | | R—N—R$_1$ | R$_2$ | R$_3$ | Parts by weight | Designation | Parts by weight | | | |
| 12 | b | N O (morpholine ring) | CH$_2$CH$_2$OH | H | 62 | Melamine | 38 | 1:2.7 | 2.84:1 | 4.6 |

(*) a-Exolit 422 ® b-Phos-Check P/40 ®

Tables 3 and 4

The tests reported in the above said tables relate to polymeric compositions containing compounds prepared according to the preceding examples.

Specimens were prepared, which consisted of stabs having a thickness of approximately 3 mm, by moulding compounds consisting of granular polymer and additives, on a platen press MOORE, with a moulding time of 7 minutes, by operating under a pressure of 40 kg/cm$^2$.

On the resulting stabs, the level of self-extinguishment is determined by measuring the respective values of oxygen Index (L.O.I. according to ASTM D-2863/77) on a STANTON REDCROFT instrument, and applying the "Vertical Burning Test", which makes it possible the material to be classified at the three Levels 94 V-0, 94 V-1 and 94 V-2 according to UL 94 standards (published by "Underwriters Laboratories"-USA).

In Table 3, the values are reported which were obtained by using isotactic polypropylene flakes having a Melt Flow Index equal to 12, and containing 96% of insolubles in boiling n-heptane, by weight.

In Table 4, the values are reported which were obtained by using a low density polyethylene in granular form having a Melt Flow Index of 7; a granular polystyrene containing 5% by weight of polybutadienic rubber and having a Melt Flow Index equal to 9; a thermoplastic polyester polyurethane (ESTANE 54600(R) ex Goodrich), and a thermoplastic polyether polyurethane (ESTANE 58300 ® ex Goodrich), both in granular form, having specific gravity values of 1.19 and 1.10 g/cm$^3$ respectively; an elastomeric ethylene-propylene copolymer containing 45% by weight of propylene; an acrylonitrile-butadione-styrone terpolymer having a specific gravity of 1.06 g/cm$^3$, a Melt Flow Index of 1.6 and containing approximately 40% of acrylonitrile and styrene and 20% of butadiene.

TABLE 3

| Example No. | Product of Example No. | PARTS BY WEIGHT | | | L.O.I. (ASTM D 2863) | UL94 3 mm |
|---|---|---|---|---|---|---|
| | | Product | PP (1) | AO (2) | | |
| 13 | 1 | 18 | 81 | 1 | 30.4 | V1 |
| 14 | 1 | 29 | 70 | 1 | 34.7 | V0 |
| 15 | 2 | 24 | 75 | 1 | 33.8 | V0 |
| 16 | 3 | 23 | 76 | 1 | 30.5 | V0 |
| 17 | 4 | 24 | 75 | 1 | 31.6 | V0 |
| 18 | 5 | 22 | 77 | 1 | 30.8 | V0 |
| 19 | 6 | 24 | 75 | 1 | 32.3 | V0 |
| 20 | 7 | 24 | 75 | 1 | 31.6 | V0 |
| 21 | 8 | 22 | 77 | 1 | 33.0 | V0 |
| 22 | 9 | 24 | 75 | 1 | 32.5 | V0 |
| 23 | 10 | 29 | 70 | 1 | 34.1 | V0 |
| 24 | 11 | 24 | 75 | 1 | 32.7 | V0 |

TABLE 3-continued

| Example No. | Product of Example No. | PARTS BY WEIGHT | | | L.O.I. (ASTM D 2863) | UL94 3 mm |
|---|---|---|---|---|---|---|
| | | Product | PP (1) | AO (2) | | |
| 25 | 12 | 23 | 76 | 1 | 32.2 | V0 |

(1) PP = polypropylene
(2) AO = antioxidant
A mixture constituted by 2 parts of dilauryl thiopropionate and 1 part of pentaerythritol tetra [3-(3,5-di-tert-butyl-4-hydroxyphenyl) propionate].

TABLE 4

| Example No. | Polymeric Support (1) | Product of Example No. | PARTS BY WEIGHT | | | L.O.I. (ASTM D 2863) | UL94 3 mm |
|---|---|---|---|---|---|---|---|
| | | | Product | Polymer | AO (2) | | |
| 26 | LDPE | 4 | 30 | 69 | 1 | 32.6 | V0 |
| 27 | LDPE | 8 | 34 | 65 | 1 | 31.4 | V0 |
| 28 | LDPE | 12 | 32 | 67 | 1 | 32.1 | V0 |
| 29 | HIPS | 8 | 34 | 65 | 1 | 31.4 | V0 |
| 30 | HIPS | 12 | 34 | 65 | 1 | 32.6 | V0 |
| 31 | PP/PE | 4 | 31 | 68 | 1 | 32.4 | V0 |
| 32 | PP/PE | 5 | 29 | 70 | 1 | 34.1 | V0 |
| 33 | (ester) PU | 3 | 29 | 70 | 1 | 34.5 | V0 |
| 34 | (ester) PU | 12 | 29 | 70 | 1 | 33.4 | V0 |
| 35 | (ether) PU | 3 | 29 | 70 | 1 | 30.8 | V0 |
| 36 | ABS | 12 | 34 | 65 | 1 | 30.0 | V0 |

(1) LDPE = low density polyethylene
HIPS = polystyrene containing 5% of butadiene rubber
(ester) PU = polyester polyurethane
(ether) PU = polyether polyurethane
PP/PE = propylene-ethylene copolymer
ABS = acrylonitrile-butadiene-styrene terpolymer
(2) AO = antioxidant
A mixture constituted by 2 parts of dilauryl thiopropionate and 1 part of pentaerythritol tetra [3-(3,5-di-tert-butyl-4-hydroxyphenyl)-propionate].

EXAMPLE 37 (COMPARISON EXAMPLE)

31 cm$^3$ of methanol 49.0 g of a solution at 37% by weight of formaldehyde and, with stirring, 25.4 g of 2,4,6-triamino-1,3,5-triazine (melamine) are charged to a reaction vessel of 0.25 liter of capacity, equipped as in Example 1.

The reaction mass is heated at 60° C. for 20 minutes, until a solution is obtained.

The resulting solution, kept at the temperature of 60° C., is fed, during a 30 minute time, to a 1 liter reactor equipped as the preceding one, containing a suspension constituted by 90 g of ammonium polyphosphate (Exolit ® 422), 200 cm$^3$ of water and 200 cm$^3$ of methanol, heated at 65° C.

The reaction is heated up to boiling temperature and is kept under refluxing conditions for 8 hours.

The reaction is allowed to coot down to room temperature, and the resulting product is filtered off, with the filter cake being washed on the same filter with a water-methanol mixture.

By drying the filter cake in an oven at 100° C., and submitting it to a subsequent heat treatment at 150° C., 119.0 9 are obtained of a white crystalline powder containing 22.3% of phosphorus, corresponding to a content of 71.0 by weight of ammonium polyphosphate.

The obtained product corresponds hence to an ammonium polyphosphate microencapsulated with resin in the ratio of 2.45:1 by weight.

The solubility of ammonium polyphosphate in water at 60° C. is of 3.6% by weight.

By operating according to the same modalities as used in Examples from 13 to 25 and using the microencapsulated ammonium polyphosphate as obtained above, the following composition is prepared:

| | |
|---|---|
| polypropylene: | 75 parts by weight |
| antioxidant: | 1 part by weight |
| microencapsulated ammonium polyphosphate as obtained as above: | 24 parts by weight |

By using the above said composition, specimens were prepared which were submitted to self-extinguisment tests according to the same modalities as disclosed hereinabove.

The following results were obtained:
L.O.I.=26.5
UL94 (3 mm): class B (the specimen burns).

We claim:

1. A self-extinguishing composition comprising:
   (a) from 90 to 40 parts by weight of a thermoplastic polymer, or of a polymer endowed with elastomeric properties;
   (b) from 10 to 60 parts by weight of one or more composites constituted by ammonium polyphosphate of formula (I):

$$(NH_4)_{n=2}P_nO_{3n+1} \qquad (I)$$

wherein n stands for an integer within the range of from 2 to 800, microencapsulated with 10–80% by weight of a resin obtained by polymerizing with aldehydes a mixture comprising:
   (1) from 0 to 50 parts by weight of one or more polyaminic derivatives;
   (2) from 50 to 100 parts by weight of one or more derivatives of 2,4,6-triamino-1,3,5-triazine having formula (II):

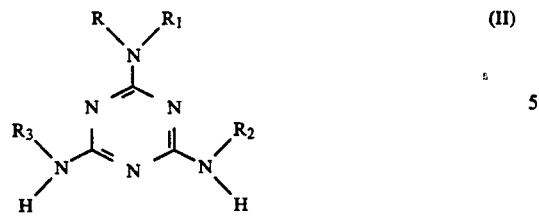

wherein at least one of radicals from R to $R_3$ is:

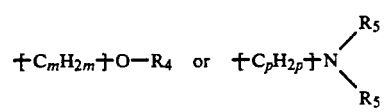

wherein:

m=an integer within the range of from 2 to 8;
   p=an integer within the range of from 2 to 6;
   $R_4$=H; $C_1$–$C_8$ alkyl; $C_2$–$C_6$ alkenyl;

$+C_qH_{2q}+O-R_6$ wherein q is an integer within the range of from 1 to 4 and $R_6$ is H or $C_1$–$C_4$ alkyl; $C_6$–$C_{12}$ cycloalkyl or alkylcycloalkyl;
   the radicals $R_5$, which may be the same or different from each other, are:
   H; $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

is replaced by a heterocyclic radical selected from the group consisting of aziridinyl, pyrrolidinyl, piperidinyl, morpholinyl, thiomorpholinyl, piperazinyl, 4-methylpiperazinyl and 4-ethylpiperazinyl linked to the alkyl chain through the nitrogen atom; or in the formula (II) the moiety:

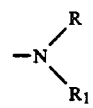

is replaced by a heterocyclic radical selected from the group consisting of aziridinyl, pyrrolidinyl, piperidinyl, morpholinyl, thiomorpholinyl, piperazinyl, 4-methylpiperazinyl, 4-ethylpiperazinyl, 2-methylpiperazinyl, 2,5-dimethylpiperazinyl, 2,3,5,6-tetramethylpiperazinyl, 2,2,5,5-tetramethylpiperazinyl, 2-ethylpiperazinyl and 2,5-diethylpiperazinyl, linked to the triazinic ring through the nitrogen atom;
   the other radicals from R to $R_3$, which may be the same or different from one another, have the above said meaning, or they are:
   H; $C_1$–$C_{18}$ alkyl; $C_2$–$C_8$ alkenyl; $C_6$–$C_{16}$ cycloalkyl or alkylcycloalkyl, possibly substituted with a hydroxy or $C_1$–$C_4$ hydroxyalkyl function.

2. The self-estinguishing polymeric composition according to claim 1, in which the aldehyde is formaldehyde or a mixture containing formaldehyde and, up to 20% by mol, another aldehyde having the general formula (III):

$$R_7-CHO \qquad (III)$$

wherein $R_7$ is $C_1$–$C_8$ alkyl; $C_2$–$C_6$ alkenyl; $C_6$–$C_{12}$ cycloalkyl; $C_6$–$C_{12}$ aryl.

3. The self-estinguishing polymeric composition according to claim 2, in which the aldehyde is formaldehyde.

4. The self-estinguishing polymeric composition according to claim 1, in which the (b) component is constituted by ammonium polyphosphate of formula (I) microencapsulated with resins obtained by means of the polymerization with formaldehyde of the only triazinic derivatives of formula (II).

5. The self-estinguishing polymeric composition according to claim 1, in which the (b) component is constituted by ammonium polyphosphate having the formula (I) microencapsulated with resins obtained by means of the polymerization with formaldehyde, of a mixture constituted by the triazinic derivatives of formula (II) and melamine.

6. The self-estinguishing polymeric composition according to claim 1, in which R and/or $R_1$ in formula (II) are equal to hydrogen.

7. The self-estinguishing polymeric composition according to claim 1, in which at least one of radicals R to $R_3$ in formula (I) is a moiety:

$$-CH_2-[-C_mH_{2m}-]-O-R_4-$$

wherein
m is an integer comprised within the range of from 1 to 3 and
$R_4$ is hydrogen or $C_1-C_4$ alkyl.

8. The self-estinguishing polymeric composition according to claim 1, in which the polyaminic derivative is selected from compounds containing the 1,3,5-triazine ring or at least one

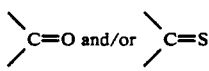

moiety and is a compound selected from the group consisting of urea, ethyleneurea, thiourea, ethylene-thiourea, propyleneurea, melamine, acetoguanamine, propionoguan-amine, butyroguanamine, isobutyroguanamine, caprinoguanamine, succinoguanamine, bengoguanamine, meta-methylbenzoguanamine, benzylquanamine, hydantoin, piperazine-2,5-dione and barbituric acid.

9. The self-estinguishing polymeric compositions according to claim 1, in which the
(a) polymer is selected from among polymers or copolymers of olefins having formula $$R-CH=CH_2$$

wherein R is a hydrogen atom or a $C_1-C_8$ alkyl or aryl radical; acrylonitrile-butadiene-styrene (ABS) copolymers; styrene-acrylonitrile copolymers (SAN); polyurethane; poly(ethyleneterephthalate); poly(butyleneterephthalate); polyamides.

10. The self-estinguishing polymeric composition according to claim 9, wherein the polymers and copolymers of olefins are selected from:
 1. isotactic or prevailingly isotactic polypropylene;
 2. HDPE, LLDPE, LDPE polyethylene;
 3. crystalline propylene copolymers with minor proportions of ethylene and/or other alpha-olefins: 1-butene, 1-hexene, 1-octene, 4-methyl-1-pentene;
 4. heterophasic compositions comprising: (A) a homopolymeric propylene fraction, or one of the copolymers as listed under above (3) point, and (B) a copolymeric fraction formed by elastomeric ethylene copolymers with an alpha-olefin, possibly containing minor proportions of a diene,
 5. elastomeric ethylene copolymers with alpha-olefins, possibly containing minor proportions of a diene.

11. The self-estinguishing polymeric composition according to claim 10, where said α-olefin of paragraph (4) is propylene or 1-butene.

12. A molded article of manufacture prepared by molding the composition of claim 1.

* * * * *

UNITED STATES PATENT AND TRADEMARK OFFICE
CERTIFICATE OF CORRECTION

PATENT NO.   : 5,302,642
DATED        : April 12, 1994
INVENTOR(S)  : Roberto CIPOLLI, et al.

It is certified that error appears in the above-indentified patent and that said Letters Patent is hereby corrected as shown below:

On the title page, Item [73], the Assignee's name should read as follows:

--Ministero Dell'Universita' e Della Ricerca Scientifica e Tecnologica, Rome, Italy--

Signed and Sealed this

Ninth Day of August, 1994

Attest:

BRUCE LEHMAN

Attesting Officer

Commissioner of Patents and Trademarks